(12) United States Patent
Chou

(10) Patent No.: US 6,217,268 B1
(45) Date of Patent: Apr. 17, 2001

(54) NET FOR FASTENING THINGS

(76) Inventor: An-Chuan Chou, No. 212, Yung An Street, Tainan (TW)

(*) Notice: Subject to any disclaimer, the term of this patent is extended or adjusted under 35 U.S.C. 154(b) by 0 days.

(21) Appl. No.: 09/395,965

(22) Filed: Sep. 14, 1999

(51) Int. Cl.[7] .................................................. B60P 7/08
(52) U.S. Cl. ............................................ 410/97; 410/118
(58) Field of Search ................................ 410/96, 97, 100, 410/117, 118; 296/100.15, 100.16; 248/499; 87/2

(56) References Cited

U.S. PATENT DOCUMENTS

| | | | |
|---|---|---|---|
| 2,669,402 | * 2/1954 | Del Mar | 410/118 |
| 3,486,723 | * 12/1969 | Harrison | 410/118 |
| 4,900,204 | * 2/1990 | Summers | 410/97 |
| 5,328,310 | * 7/1994 | Lockney | 410/97 |
| 5,772,371 | * 6/1998 | Ackerman | 410/118 |
| 5,876,167 | * 3/1999 | Selby | 410/97 |
| 6,017,174 | * 1/2000 | Ross et al. | 410/100 |
| 6,152,664 | * 11/2000 | Dew et al. | 410/100 |

* cited by examiner

*Primary Examiner*—Stephen T. Gordon
(74) *Attorney, Agent, or Firm*—Rosenberg, Klein & Lee (57) ABSTRACT

A fastening net for use on a luggage rack of a car has a rope, several fixing elements, hooking elements and a central fixing element. The rope is firstly arranged to have a first "8", the first "8" being formed diagonally across a predetermined square defining the dimension of the net. Then, a second, a third and a fourth "8"s are formed in a similar way, constituting the major part of the net. The rest of the rope is arranged across the intermediate portions of the "8"s, approaching the center of the net. The fixing elements are each coupled to a respective one of the intersections of all parts of the rope. The hooking elements are fixed to the part of the rope constituting the edge of the net. The central fixing element is connected to the middle portions of all the "8"s for locating the sections of the rope from the center.

4 Claims, 9 Drawing Sheets

NET FOR FASTENING THINGS

BACKGROUND OF THE INVENTION

The present invention relates to a net for fastening things, and particularly to one which is used to fasten luggage carried on the luggage rack of a station wagon, jeep, etc.

Station wagons or jeeps can carry luggage on the luggage rack on the top thereof, and nets are used to fasten the luggage; it is very convenient in travelling.

Figure 10:
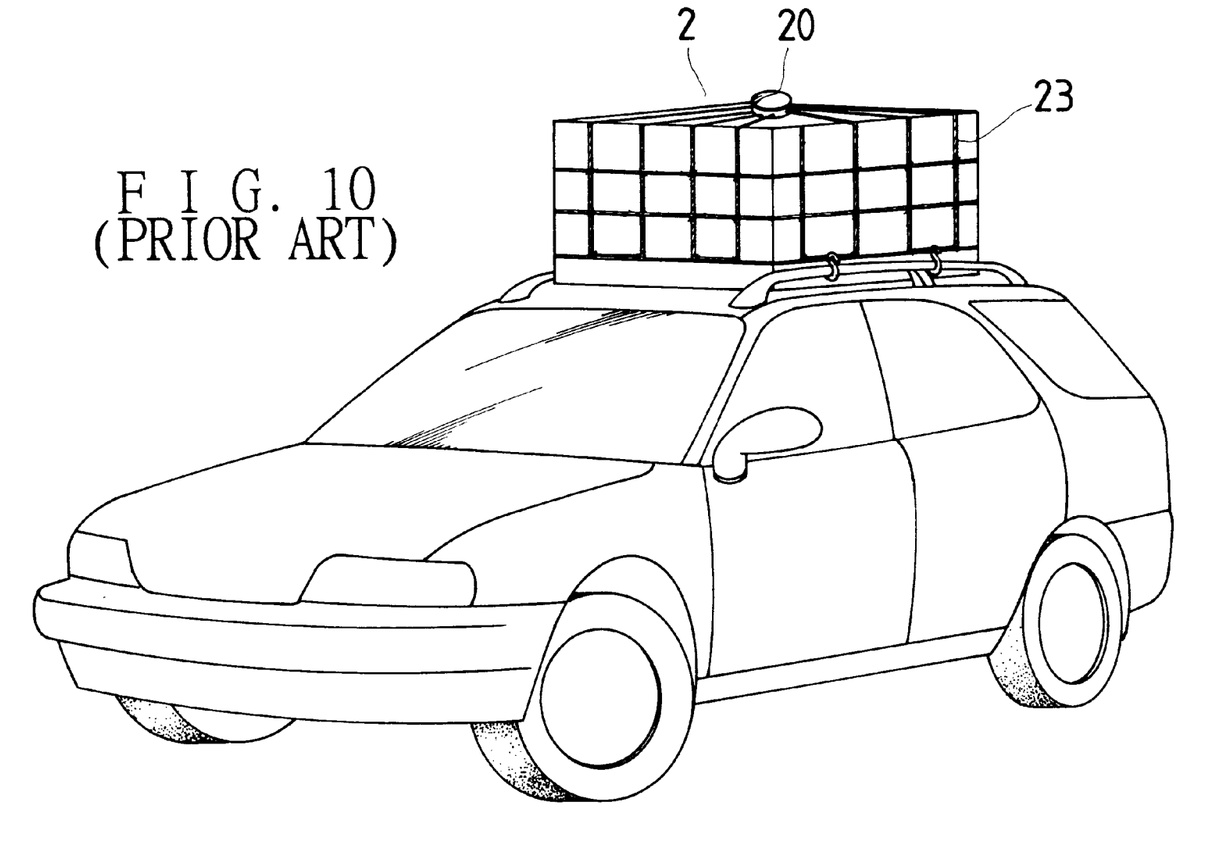
FIG. 10 is a view showing the prior art fastening net used on the luggage rack of a car.
Figure 11:
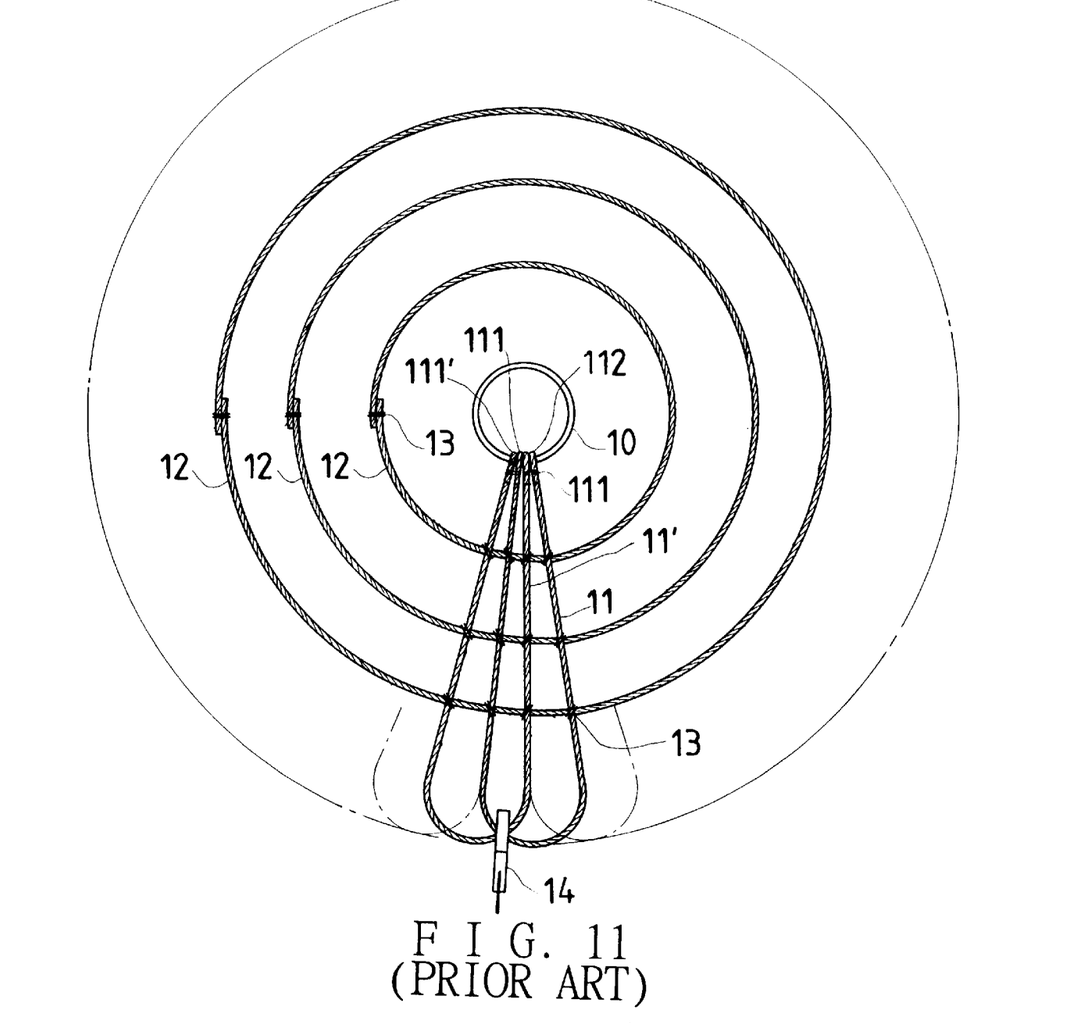
FIG. 11 is a top view of the prior art fastening net as described in the Background.
Figure 12:
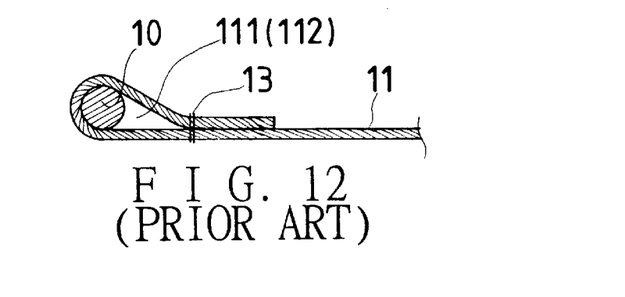
FIG. 12 is a fragmentary cross-sectional view of the prior art fastening net of FIG. 11.

Referring to FIGS. 10, 11 and 12, a heretofore known net for fastening things comprises a central ring 10, several longitudinal ropes 11, and transverse ropes 12.

Each of the longitudinal ropes 11 is connected to the central ring from two ends thereof. Referring specifically to FIG. 12, the ends each forms a connecting loop 111, 112 around the central ring 10, and is fixed by a fixing element 13.

The two connecting loops 111, 112 of each of the longitudinal ropes 11 are arranged such that one connecting loop 111' of the adjacent longitudinal rope 11' is located therebetween.

The transverse ropes 12 are each arranged across the longitudinal ropes 11, forming a circle around the central ring 10; two ends of each of the transverse ropes 12 are fastened to each other by a fixing element 13. The contact point between of the longitudinal ropes 11 and the transverse ropes 12 are also fastened with fixing elements 13.

Each of the contact points between outward portion of the longitudinal ropes 11 are connected to a respective hooking element 14.

Thus, the net can be used to fasten the luggage on the top of a station wagon with the hooking elements 14 connected to the luggage rack.

However, it is found that the above said fastening net has undesirable features as follows.

1. Being elastic, the longitudinal ropes and the transverse ropes will get thinner when pulled. So, when the net is used to fasten things, the ropes are thinner. Because all the contact points of the ropes are fixed by fixing elements, the fastening net cannot fasten the things any longer when the fixing elements become loose and fall off the ropes.

2. The fastening net is made of relatively many parts so the manufacturing thereof is a waste of labor, and the cost is relatively high.

SUMMARY OF THE INVENTION

It is a main object of the present invention to provide a fastening net for use on the top of a car, which is strong and can be manufactured cost-effectively.

The fastening net of the present invention comprises a rope, several fixing elements, hooking elements and a central fixing element.

In making the fastening net, the rope is firstly arranged to have a first "8" formed diagonally across a predetermined square defining the dimension of the net. Then, a second, a third, and a fourth "8"s are formed in a similar way to constitute the major part of the net. The rest of the rope is arranged across the intermediate portions of the "8"s, approaching the center of the net. The fixing elements are each coupled to a respective one of the intersections of all parts of the rope. The hooking elements are fixed to the part of the rope constituting the edge of the net.

The central fixing element consists of a cover and a base; the cover has engaging protrusions spaced apart on an edge. The base has engaging sockets spaced apart on an edge, and confining gaps adjacent to the engaging sockets. The parts of the "8"s near the center of the net are passed through the central fixing element, and fixed between the confining gaps and the cover. The engaging protrusions of the cover are passed into the engaging sockets of the base for the base and the cover to be firmly connected to each other.

The fastening net is made of a single rope so it is stronger and can be made relatively easily when compared with the prior art fastening net.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
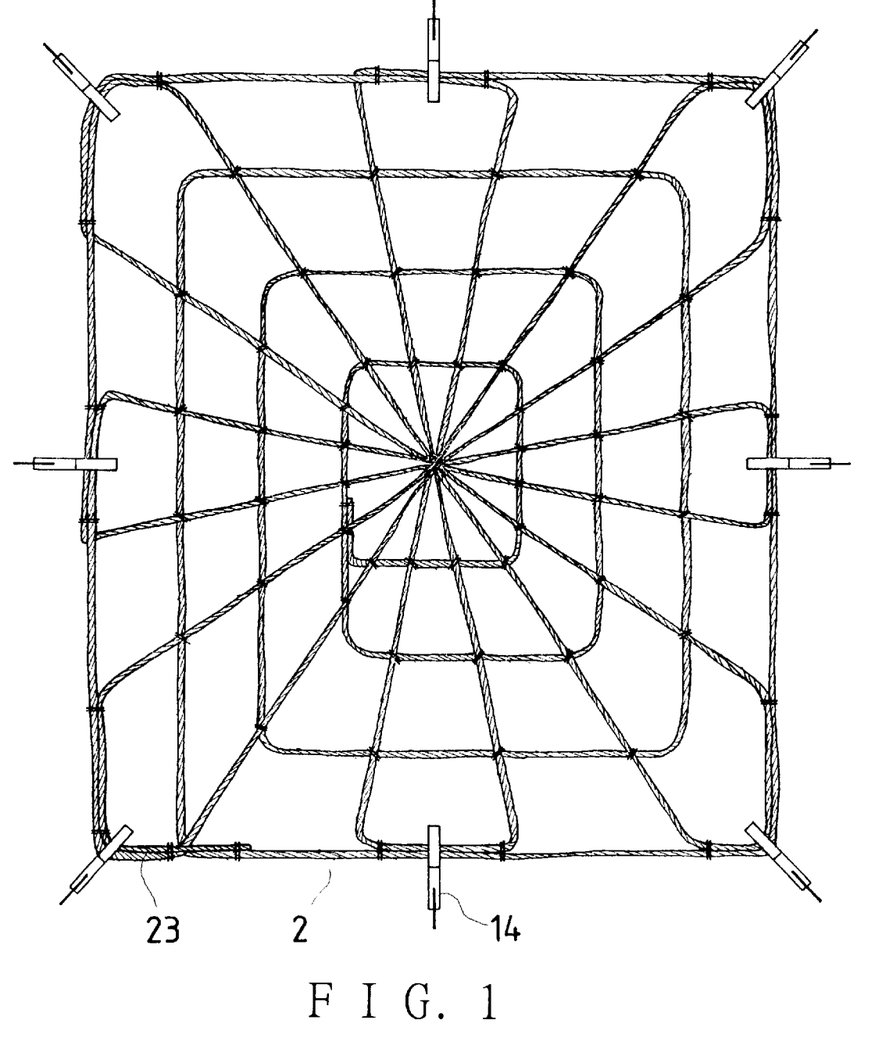
FIG. 1 is a top view of a fastening net of the present invention.

Referring to FIG. 1, a fastening net 2 of the present invention comprises a rope 23 arranged to form a net, fixing elements 13, and hooking elements 14.

Figure 2:
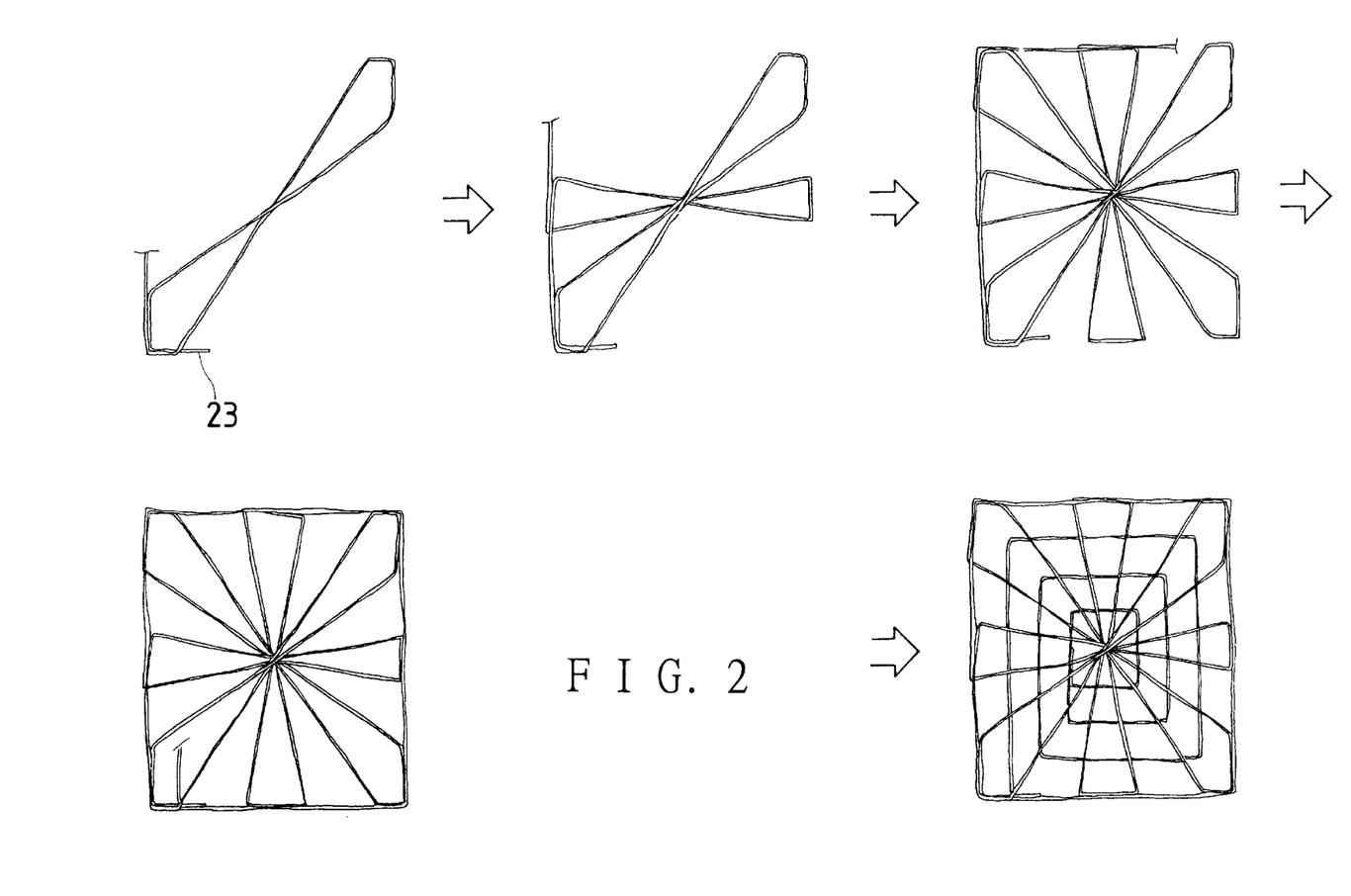
FIG. 2 is a view showing the rope being arranged to become a net according to the present invention.

Referring to FIG. 2, the rope 23 is firstly arranged to have a first "8" shape with the middle portions placed across each other; the first "8" being arranged diagonally across net. Secondly, a second "8" shape is made from the rope. Then, a third and a fourth "8" shapes are formed in a same way. The outer sides of the net substantially form a square. Finally, the rest of the rope is arranged across the intermediate portions of the rope with "8" shapes, gradually approaching the center. The contact points of all the sections of the rope are fixed by the fixing elements 13. And, the hooking elements 14 are coupled to the outer circumference of the rope.

Thus, the fastening net can be used to fasten things with the hooking elements 14 connected to the luggage rack of the top of a car.

Figure 3:
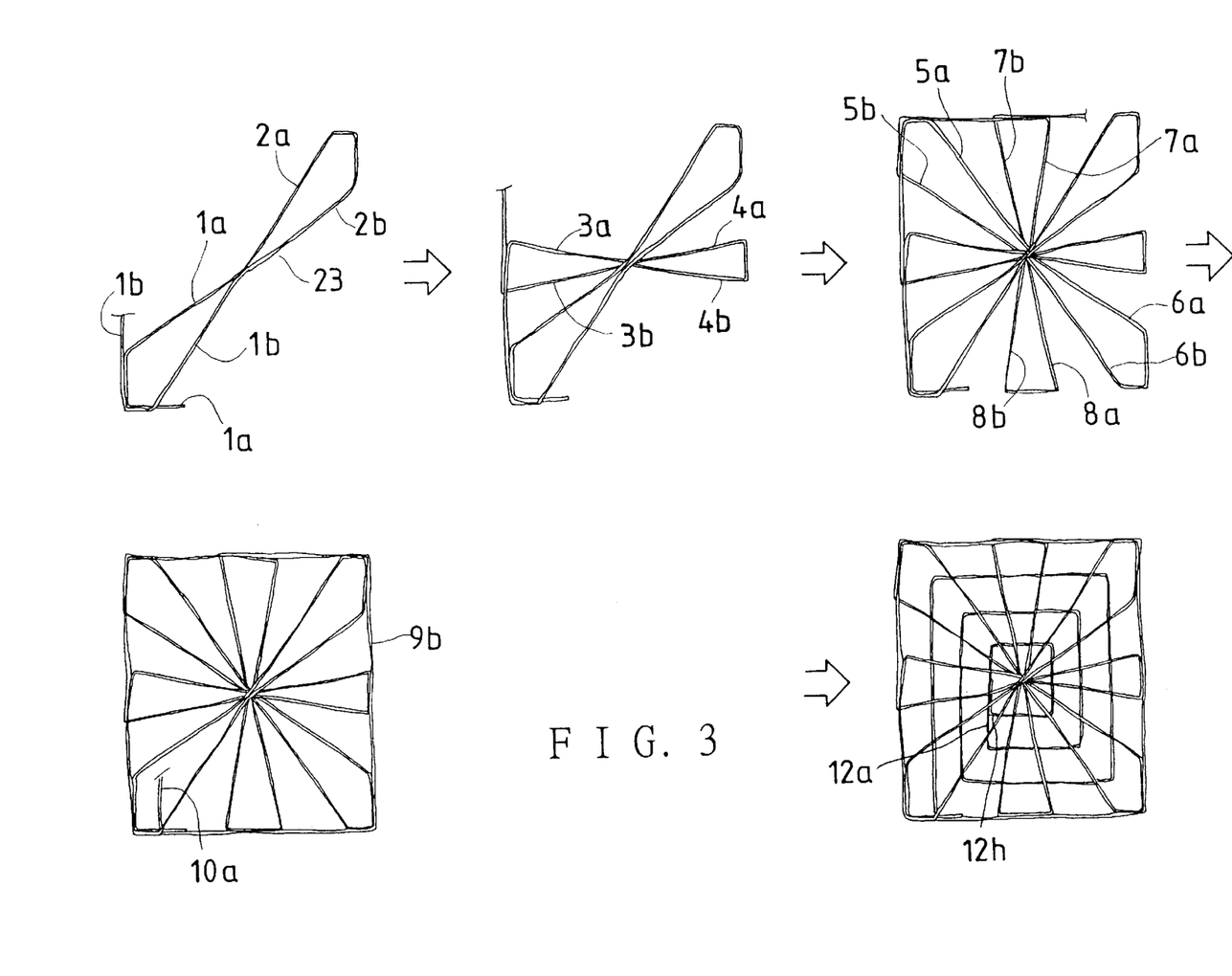
FIG. 3 is a view showing the rope being arranged to become a net according to the second embodiment of the present invention.
Figure 4:
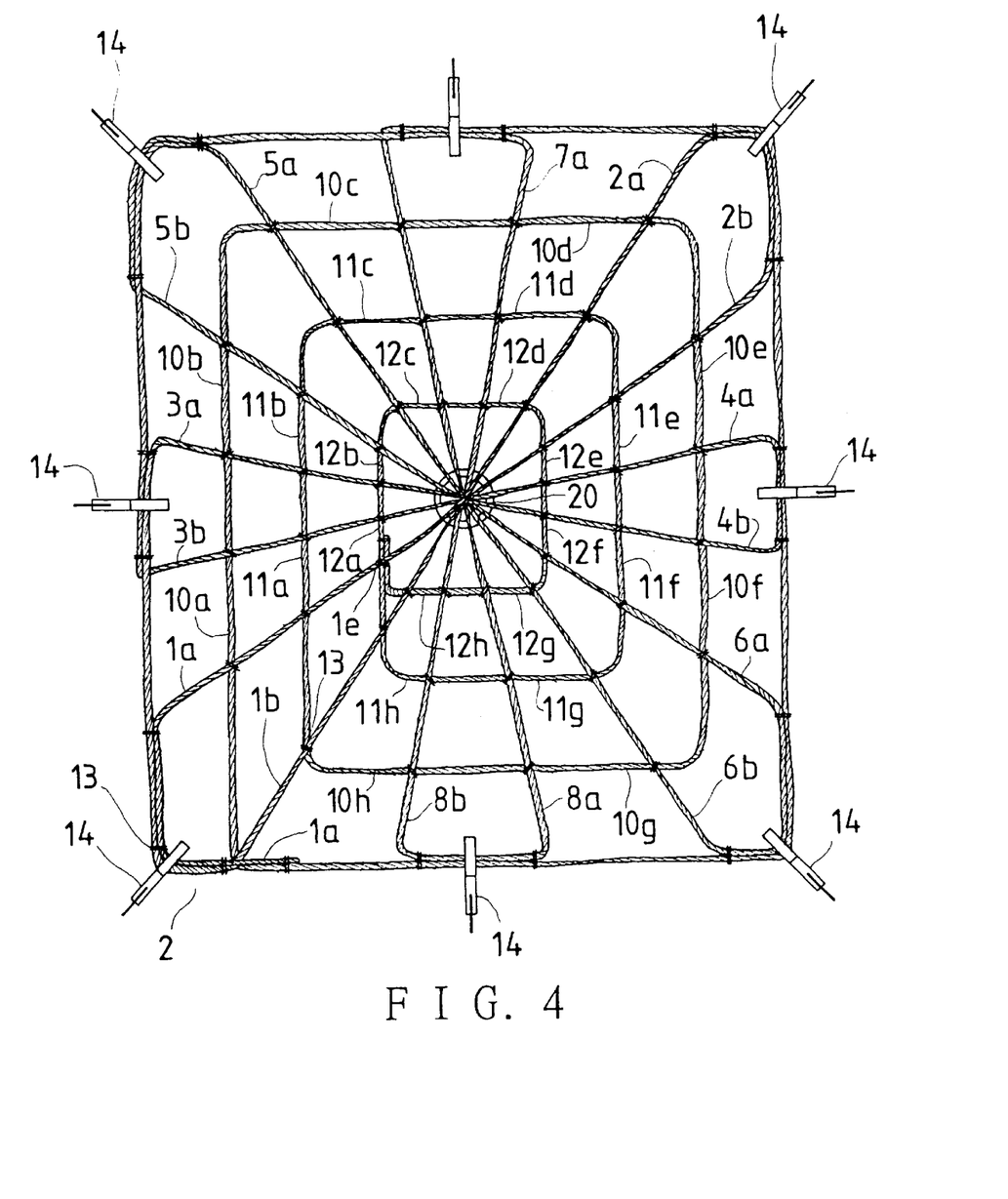
FIG. 4 is a top view of a fastening net of the present invention with a central fixing element coupled thereto.

Referring to FIGS. 3 and 4, in a second embodiment of the present invention, the rope 23 is firstly arranged to form a first "8" shape by making section 1a, section 2a, section 2b and section 1b in sequence; the middle portions of the rope are not arranged to lie across each other. Then, a second "8" shape is formed by making sections 3a, 4a, 4b, 3b in sequence. The middle portions of the second "8" are not arranged to lie across each other, either. A third and a fourth "8" shapes are formed in a same way forming sections 5a, 6a, 6b, 5b, 7a, 8a, 8b, 7b in sequence. Then, the rest of the rope is arranged across the intermediate portions of the sections 1a, 1b and so on, gradually approaching the center and having substantially rectangular shapes. The substantially rectangular portions are divided into sections 10a, 10b, 10c, 10d, 10e, 10f, 10g, 10h, 11a, 11b, 11c, 11d, 11e, 11f, 11g, 11h, 12a, 12b, 12c, 12d, 12e, 12f, 12g, and 12h. The number of the substantially rectangular portions depends on the dimension of the net.

The contact points between all sections of the rope are fixed by the fixing elements 13. And, the outer circumference of the net is provided with hooking elements 14.

Referring to FIGS. 5, 6, 7, 8 and 9, a central fixing element 20 is provided for fixing the parts of the rope in the center of the net. The central fixing element 20 comprises a base 21 and a cover 22. The base 21 has confining gaps 211 spaced apart around an edge thereof, and engaging sockets 212 spaced apart adjacent to the confining gaps 211. The confining gaps 211 each has a middle projection 215. The engaging sockets 212 each has a through hole 213 and an engaging recess 214 (see specifically FIG. 6).

Figure 5:
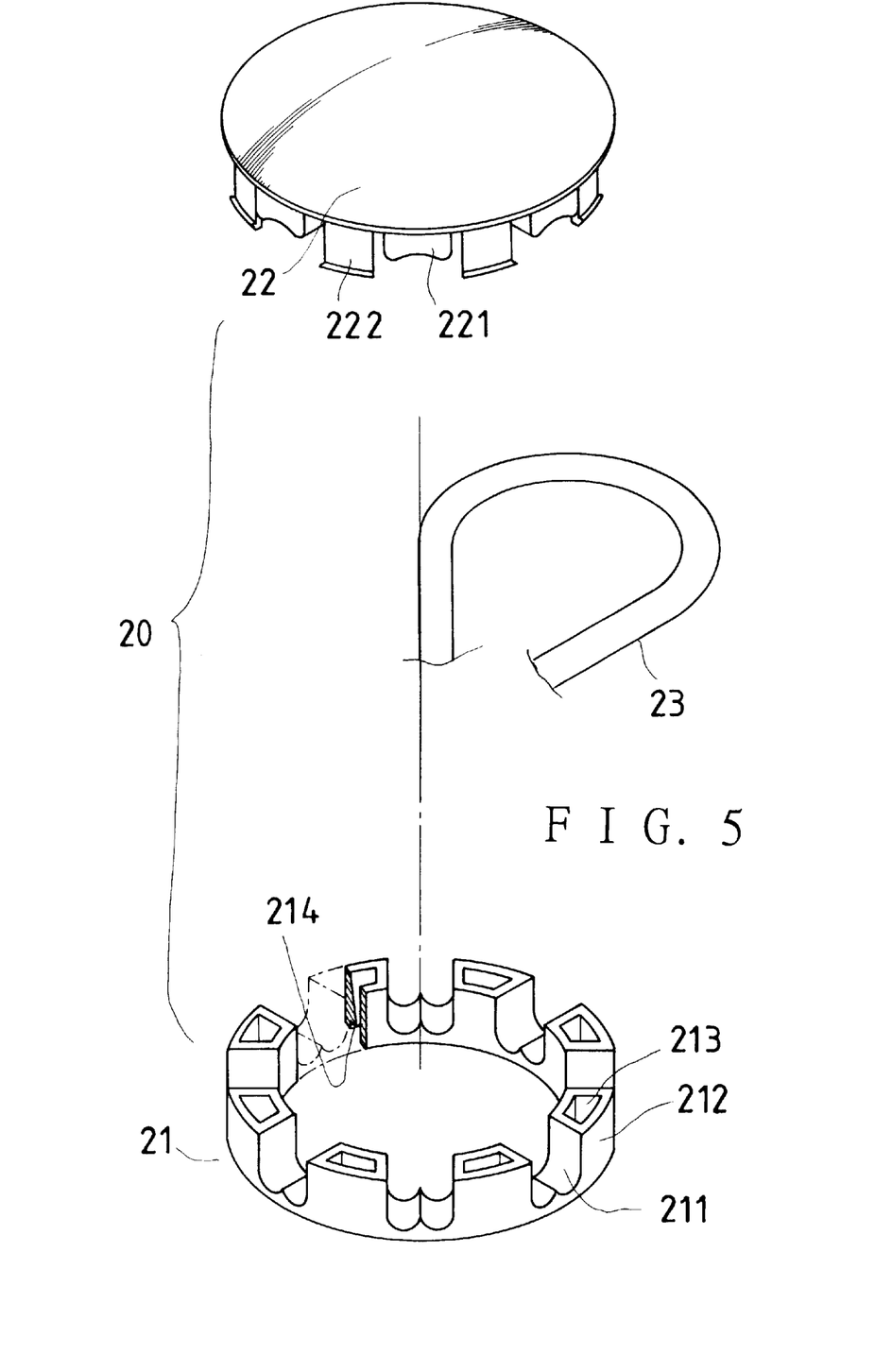
FIG. 5 is an exploded perspective view of the central fixing element according to the present invention.
Figure 6:
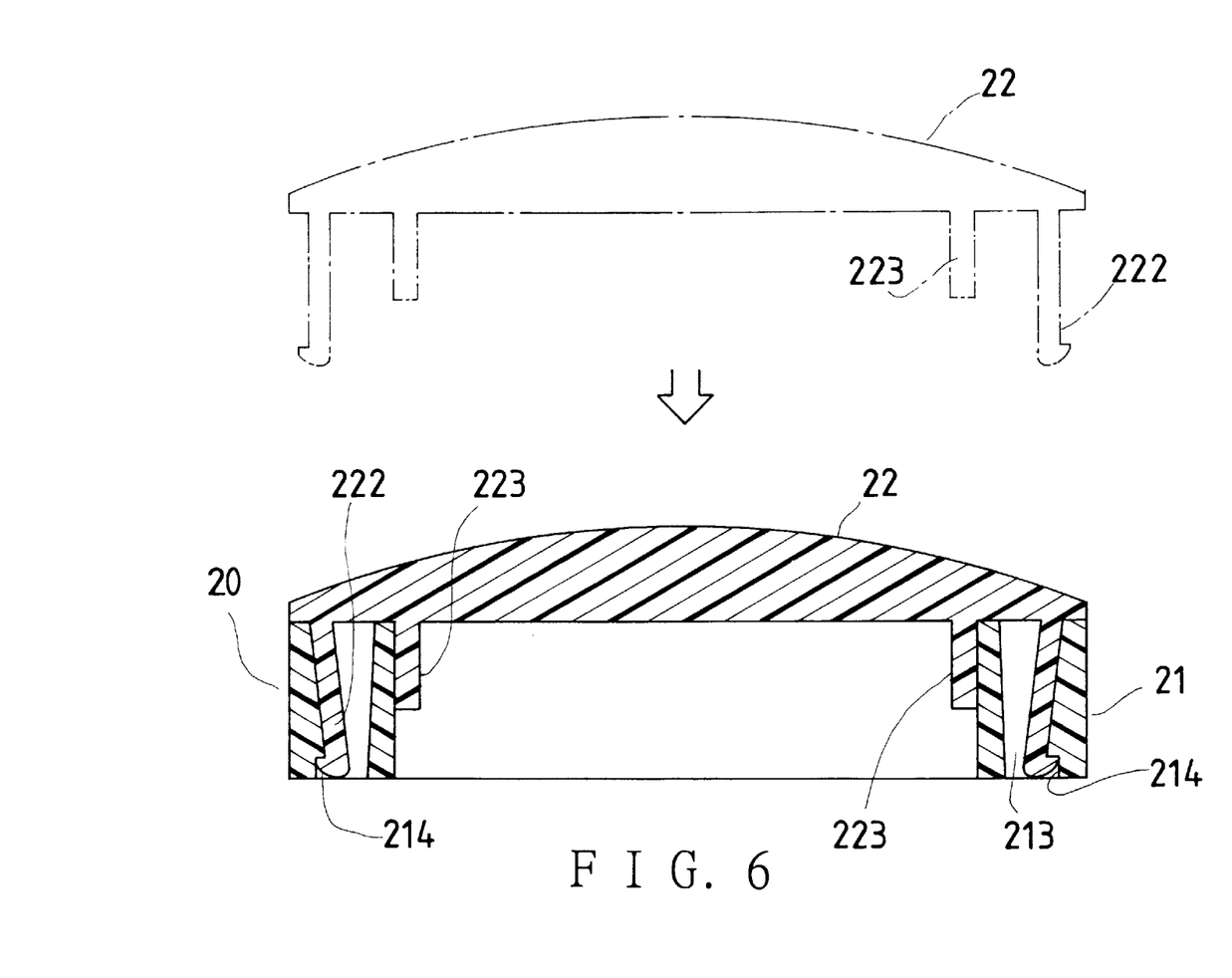
FIG. 6 is a cross-sectional view of the central fixing element in FIG. 5.

The cover 22 has confining blocks 221 spaced apart around an edge thereof, and engaging protrusions 222 spaced apart each adjacent to a respective one of the confining blocks.

The confining blocks 221 each has a middle concavity 225 and two protruding parts 224 at two sides of the middle concavity 225. The cover 22 further has locating walls 223 each located behind a respective one of the engaging protrusions 222.

Figure 7:
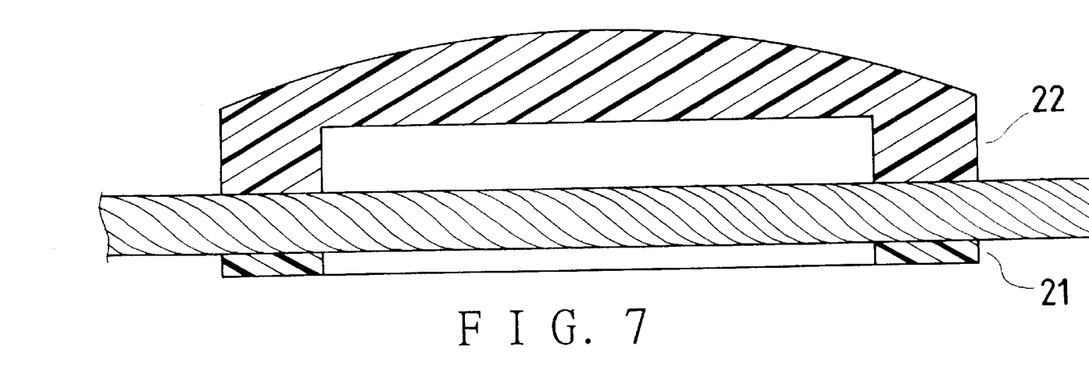
FIG. 7 is a cross-sectional view of the central fixing element with the rope passed therethrough according to the present invention.

In combination, the engaging protrusions 222 are each inserted into a respective one of the through hole 213 of the engaging socket 212 of the base 21 with the engaging protrusion 222 inserted into the engaging recess 214 in order to connect the cover 22 to the base 21. The locating walls 223 contact the inner parts of the engaging sockets 212 of the base 21 for securing the connection between the base 21 and the cover 22.

Figure 8:
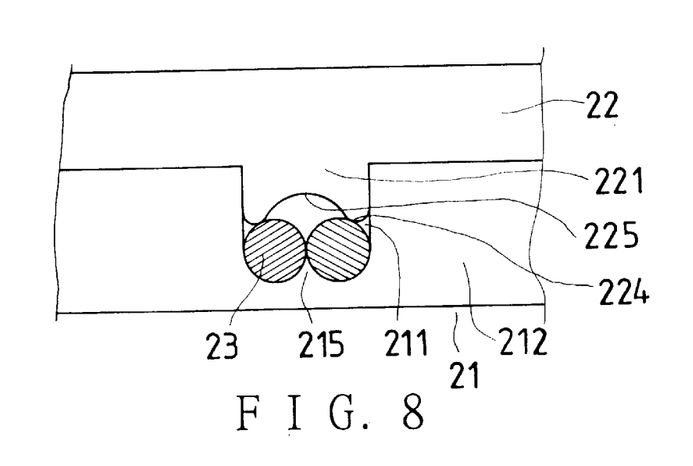
FIG. 8 is a fragmentary cross-sectional view of the central fixing element with the rope passed therethrough according to the present invention.

The part of the rope near the center of the net is located in the confining gaps 211 of the base 21 of the central fixing member 20. Referring to FIG. 8, the confining gaps 211 each receives two sections of the rope. The two sections are each located on a respective one of two recesess on two sides of the middle projection 215 of the confining gap 211, and depressed by a respective one of the protruding parts 224 such that the sections of the rope can be fixed in the confining gap 211.

Figure 9:
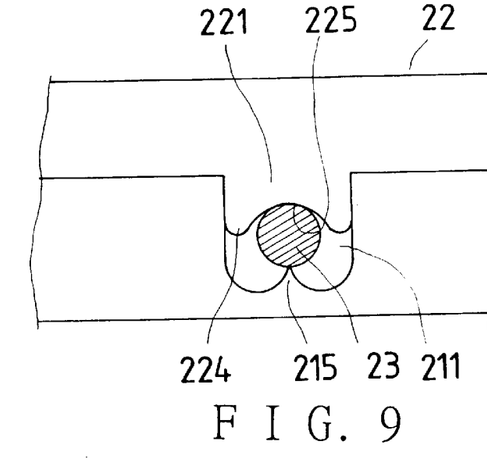
FIG. 9 is another cross-sectional view of the central fixing element with the rope passed therethrough according to the present invention.

Referring to FIG. 9, the confining gaps 211 each receives a section of the rope. The section of the rope is located between the middle projection 215 of the confining gap 211 and the middle concavity 225 of the confining block 221 of the cover 22 such that the section of rope can be fixed to the central fixing element 20.

From the above description, it can be easily understood that the fastening net of the present invention has desirable features as follows.

1. The fastening net is made of one single rope, reducing the possibility of the separate ropes of a net falling apart.

2. The net can be manufactured with relatively few parts and relatively little labor. Therefore, the cost of the net is lower than that of the prior art net in the Background.

What is claimed is:

1. A fastening net comprising:
   (a) a rope arranged to have a first "8" shape, said first "8" shape being arranged diagnally across said net, said rope being arranged to have second, third and fourth "8" shapes with outer sides of said "8" shape forming a substantially square shape to become an edge of said net, an additional portion of said rope being arranged to lie across intermediate portions of said "8" shapes;
   (b) a plurality of fixing elements, said fixing elements being each connected to a respective one of contact points of intermediate portions of said rope for fixing said rope for same to become a net;
   (c) a plurality of hooking elements coupled to a respective part of said edge of said net.

2. The fastening net as claimed in claim 1, wherein said rope is arranged with intermediate portions thereof lying across each other to form said "8" shapes.

3. The fastening net as claimed in claim 2, wherein said rope is arranged such that a lower left side, an upper left side, an upper right side, and a lower right side are formed in sequence for each of said "8" shapes such that none of said "8" shapes have said intermediate portions of said rope forming said "8" shapes lying across each other.

4. The fastening net as claimed in claim 1 further having a central fixing element including:
   (a) a base member having confining gaps spaced apart around an edge thereof, said base member further having engaging sockets spaced apart adjacent to said confining gaps; said confining gaps each having a middle projection; said engaging sockets each having a through hole and an engaging recess on an inner side thereof;
   (b) a cover member having confining blocks spaced apart on an edge thereof, and engaging protrusions spaced apart adjacent to said confining blocks; said confining blocks each having a middle concavity, and two protruding parts at two sides of said middle concavity; said cover member being coupled to said base member with said engaging protrusions each inserted into a respective one of said engaging recesses of said base member; intermediate portions of said "8" shapes near the center of said net being fixed between said confining gaps and said confining blocks of said central fixing element.

* * * * *